(12) United States Patent
Salmimaa et al.

(10) Patent No.: US 10,460,636 B2
(45) Date of Patent: Oct. 29, 2019

(54) CONTROL OF SELECTIVE ACTUATION OF A LIGHT FILTER ARRAY

(71) Applicant: Nokia Technologies Oy, Espoo (FI)

(72) Inventors: Marja Salmimaa, Tampere (FI); Toni Jarvenpaa, Akaa (FI); Jan Eskolin, Pirkkala (FI); Juha Nurmi, Salo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/738,745

(22) PCT Filed: Jun. 28, 2016

(86) PCT No.: PCT/FI2016/050474
§ 371 (c)(1),
(2) Date: Dec. 21, 2017

(87) PCT Pub. No.: WO2017/005968
PCT Pub. Date: Jan. 12, 2017

(65) Prior Publication Data
US 2018/0190166 A1   Jul. 5, 2018

(30) Foreign Application Priority Data
Jul. 3, 2015   (EP) .................................... 15175166

(51) Int. Cl.
*G09G 3/00*   (2006.01)
*G02B 27/01*   (2006.01)

(52) U.S. Cl.
CPC .......... *G09G 3/002* (2013.01); *G02B 27/017* (2013.01); *G02B 27/0172* (2013.01); *G02B 2027/014* (2013.01); *G02B 2027/0118* (2013.01); *G02B 2027/0178* (2013.01); *G09G 2300/023* (2013.01); *G09G 2330/021* (2013.01); *G09G 2330/022* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2003/0169213 A1* | 9/2003 | Spero | G02B 5/20 345/7 |
| 2010/0253671 A1 | 10/2010 | Perry et al. | 345/212 |
| 2010/0309096 A1 | 12/2010 | Inoh | 345/5 |

(Continued)

*Primary Examiner* — Yanna Wu
(74) *Attorney, Agent, or Firm* — Harrington & Smith

(57) ABSTRACT

A method including, in a standard display mode, causing display of a graphical element at a position on a see through display that includes a light projection display that overlays a light filtration array such that the light projection display projects the graphical element at the position on the see through display and the light filtration array filters ambient light at the position on the see through display, transitioning from the standard display mode to a low power display mode, causing termination of display of the graphical element on the see through display based on the low power display mode, determining that an event has occurred, generating a notification that signifies the event, and causing actuation of the light filtration array such that a plurality of light filtration cells of the light filtration array are selectively actuated in a pattern that depicts the notification is disclosed.

14 Claims, 9 Drawing Sheets

(56) References Cited

U.S. PATENT DOCUMENTS

| | | | |
|---|---|---|---|
| 2012/0242560 A1* | 9/2012 | Nakada | G09G 3/3406 345/8 |
| 2013/0257691 A1* | 10/2013 | Saito | G02B 27/017 345/8 |
| 2013/0342512 A1 | 12/2013 | Smith et al. | 345/204 |
| 2014/0145914 A1* | 5/2014 | Latta | G06F 1/3215 345/8 |

* cited by examiner

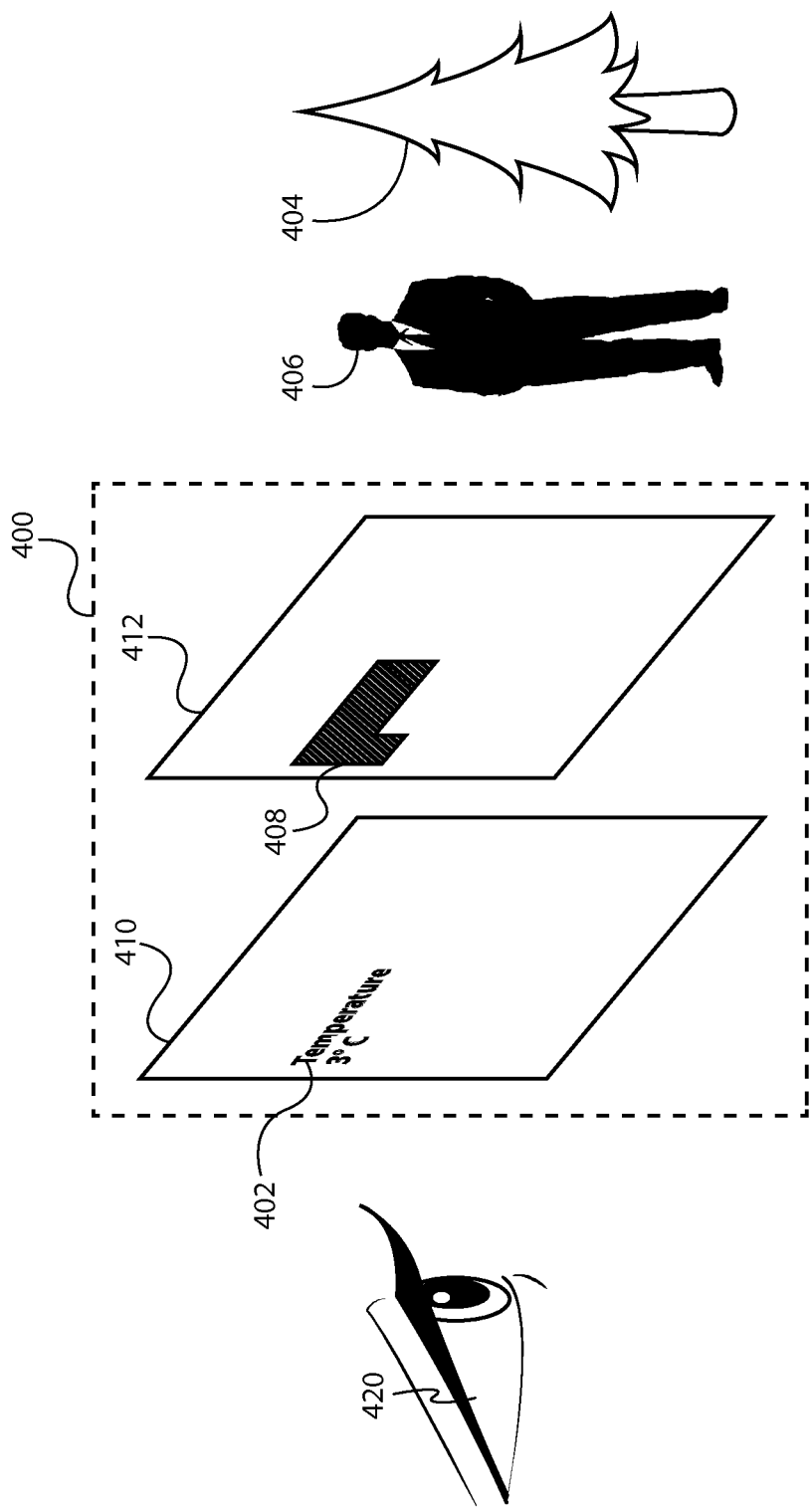

CONTROL OF SELECTIVE ACTUATION OF A LIGHT FILTER ARRAY

TECHNICAL FIELD

The present application relates generally to causation of actuation of a light filtration array.

BACKGROUND

As electronic apparatuses become increasing prevalent in our society, users of such electronic apparatuses utilize their electronic apparatuses in almost every aspect of the users' lives, from communication, to navigation, to scheduling. As such, it may be desirable to configure an apparatus such that the apparatus may provide the user of the apparatus with information in an efficient and unobtrusive manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for, in a standard display mode, causing display of a graphical element at a position on a see through display that comprises a light projection display that overlays a light filtration array such that the light projection display projects the graphical element at the position on the see through display and the light filtration array filters at least a portion of ambient light at the position on the see through display, transitioning from the standard display mode to a low power display mode that configures the see through display to consume less power than the see through display consumes in the standard display mode, causing termination of display of the graphical element on the see through display based, at least in part, on the low power display mode, determining that an event has occurred, generating a notification that signifies the event, and causing actuation of the light filtration array such that a plurality of light filtration cells of the light filtration array are selectively actuated in a pattern that depicts the notification based, at least in part, on the low power display mode.

One or more example embodiments may provide an apparatus, a computer readable medium, a computer program product, and/or a non-transitory computer readable medium having means for, in a standard display mode, causing display of a graphical element at a position on a see through display that comprises a light projection display that overlays a light filtration array such that the light projection display projects the graphical element at the position on the see through display and the light filtration array filters at least a portion of ambient light at the position on the see through display, means for transitioning from the standard display mode to a low power display mode that configures the see through display to consume less power than the see through display consumes in the standard display mode, means for causing termination of display of the graphical element on the see through display based, at least in part, on the low power display mode, means for determining that an event has occurred, means for generating a notification that signifies the event, and means for causing actuation of the light filtration array such that a plurality of light filtration cells of the light filtration array are selectively actuated in a pattern that depicts the notification based, at least in part, on the low power display mode.

An apparatus comprising at least one processor and at least one memory, the memory comprising machine-readable instructions, that when executed cause the apparatus to perform, in a standard display mode, cause display of a graphical element at a position on a see through display that comprises a light projection display that overlays a light filtration array such that the light projection display projects the graphical element at the position on the see through display and the light filtration array filters at least a portion of ambient light at the position on the see through display, transition from the standard display mode to a low power display mode that configures the see through display to consume less power than the see through display consumes in the standard display mode, cause termination of display of the graphical element on the see through display based, at least in part, on the low power display mode, determine that an event has occurred, generate a notification that signifies the event, and cause actuation of the light filtration array such that a plurality of light filtration cells of the light filtration array are selectively actuated in a pattern that depicts the notification based, at least in part, on the low power display mode.

One or more example embodiments further perform receiving information indicative of a notification selection input that indicates selection of the notification while the apparatus is operating in the light filtration display mode, transitioning the apparatus from the low power display mode to the standard display mode based, at least in part, on the notification selection input, and causing display of event content associated with the event on the light projection display based, at least in part, on the standard display mode.

In at least one example embodiment, the light projection display overlays the light filtration array such that the light projection display is between a viewer of the see through display and the light filtration array.

In at least one example embodiment, the termination of display of the graphical element on the see through display comprises causing the light projection display to terminate projection of the graphical element, and causing the light filtration array to terminate filtration of the ambient light at the position on the see through display.

In at least one example embodiment, the position on the see through display corresponds with a position on the light projection display and a position on the light filtration array, and the causation of the light filtration array to terminate filtration of the ambient light at the position on the see through display comprises causing actuation of the light filtration array such that a plurality of light filtration cells of the light filtration array are selectively actuated in a pattern that fails to filter the ambient light at the position on the light filtration array.

In at least one example embodiment, the causation of the light projection display to terminate projection of the graphical element comprises disabling the light projection display.

In at least one example embodiment, the causation of display of the graphical element at the position on the see through display comprises causing projection, by the light projection display, of the graphical element at the position on the see through display, and causing actuation of the light filtration array such that a plurality of light filtration cells of the light filtration array are selectively actuated in a pattern that filters at least a portion of ambient light at the position on the see through display.

In at least one example embodiment, the light filtration array is at least one of an electrochromic light filtration array, a liquid crystal light filtration array, or a shutter light filtration array.

In at least one example embodiment, the see through display is comprised by a head mounted display.

In at least one example embodiment, the position on the see through display corresponds with a position on the light projection display and a position on the light filtration array, and the causation of display of the graphical element at the position on the see through display comprises causing projection, by the light projection display, of the graphical element at the position on the light projection display, and causing actuation of the light filtration array such that a plurality of light filtration cells of the light filtration array are selectively actuated in a pattern that filters the ambient light at the position on the light filtration array.

In at least one example embodiment, the position on the light projection display is a position on the light projection display that is perceived by a viewer of the see through display to correspond with the position on light filtration array.

In at least one example embodiment, the causation of projection, by the light projection display, of the graphical element at the position on the light projection display is performed such that the graphical element is projected into a retina of a viewer of the see through display.

In at least one example embodiment, the position on the see through display is indicative of a cross-section through the light projection display and the light filtration array, such that the position on the see through display corresponds with a position on the light projection display and a position on the light filtration array.

In at least one example embodiment, the see through display fails to comprise an active light source that is overlain by the light filtration array.

In at least one example embodiment, the see through display fails to comprise an active light source such that the light filtration array is positioned between a viewer of the see through display and the active light source.

In at least one example embodiment, the actuation of the light filtration array such that the plurality of light filtration cells of the light filtration array are selectively actuated in the pattern that depicts the notification is performed absent consideration of any object that is viewable through the see through display.

In at least one example embodiment, the actuation of the light filtration array such that the plurality of light filtration cells of the light filtration array are selectively actuated in the pattern that depicts the notification is performed absent consideration of any graphical element that is displayed on the light projection display.

In at least one example embodiment, the actuation of the light filtration array such that the plurality of light filtration cells of the light filtration array are selectively actuated in the pattern that depicts the notification is performed absent consideration of any light source that is viewable through the see through display.

In at least one example embodiment, the event is a communication event, and the notification is indicative of the communication event.

In at least one example embodiment, the event is a navigational event, and the notification is indicative of the navigational event.

In at least one example embodiment, the event is a weather event, and the notification is indicative of the weather event.

In at least one example embodiment, the event is a calendar event, and the notification is indicative of the calendar event.

In at least one example embodiment, the notification comprises static visual information.

In at least one example embodiment, the notification comprises animated visual information.

BRIEF DESCRIPTION OF THE DRAWINGS

For a more complete understanding of one or more example embodiments, reference is now made to the following descriptions taken in connection with the accompanying drawings in which:

FIGS. 4A-4C are diagrams illustrating display of a graphical element on a see through display according to at least one example embodiment;

DETAILED DESCRIPTION OF THE DRAWINGS

Figure 1:
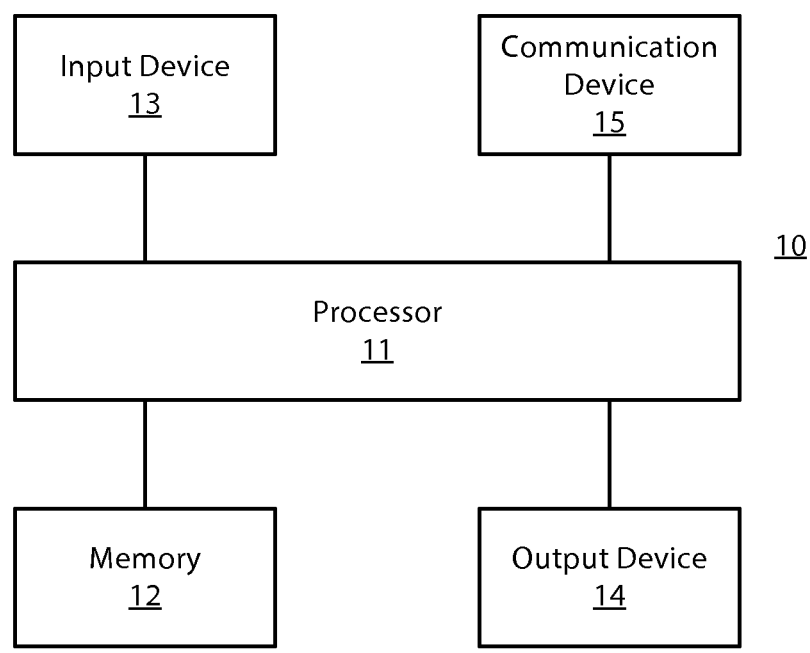
FIG. 1 is a block diagram showing an apparatus according to at least one example embodiment.

Various example embodiments and some of their potential advantages are understood by referring to FIGS. 1 through 7 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a see through display, a head mounted display, a near eye display, a wearable apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2A:
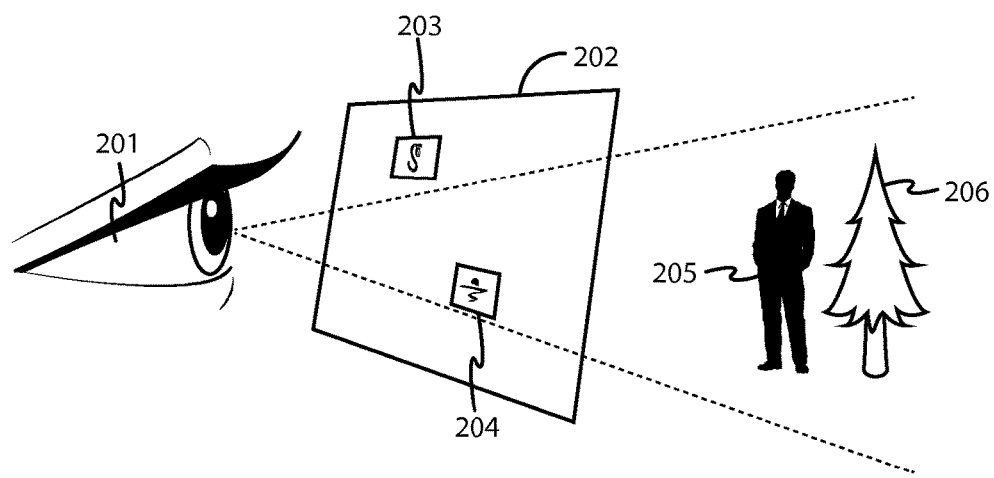
FIGS. 2A-2B are diagrams illustrating head mounted displays according to at least one example embodiment.
Figure 2B:
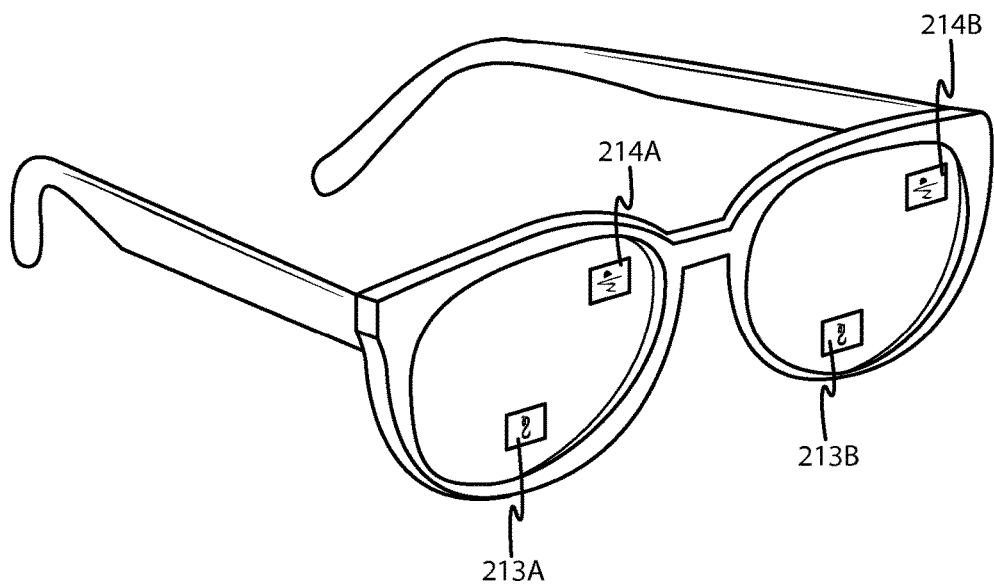

FIGS. 2A-2B are diagrams illustrating head mounted displays according to at least one example embodiment. The examples of FIGS. 2A-2B are merely examples and do not limit the scope of the claims. For example, the display type may vary, the configuration of the display may vary, the shape of the display may vary, and/or the like.

In many circumstances, a user may desire to interact with an electronic device. In such circumstances, it may often be desirable for the user to interact with an electronic apparatus by way of a head mounted display. For example, the user may interact with a program interaction screen associated with a program. In some circumstances, it may be desirable for a head mounted display to be a see through display. In at least one example embodiment, a see through display is a display that presents information to a user, but through which objects on an opposite side of the display from the user may be seen. A see through display may be comprised by a window, a windshield, a visor, glasses, and/or the like. A head mounted display may, for example, be a display that is head mountable, a display that is coupled to an element that is wearable at a location on and/or proximate to the head of a user, a display that is wearable at a location on and/or proximate to the head of a user, and/or the like. In at least one example embodiment, a head mounted display is a see through head mounted display.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. In such an example, information 203 may be associated with, identify, and/or the like, object 205. For example, information 203 may indicate an identity of object 205. In at least one example embodiment, display 202 may be comprised by a head mounted display.

In some circumstances, a display, such as display 202 of FIG. 2A, may display information with a particular illumination level, the display as a whole may have an illumination level, and/or the like. For example, the display may comprise a backlight, and the backlight may have various illumination levels in different circumstances. For example, the backlight may have a low illumination level when the ambient lighting conditions near the display are dim, and the backlight may have a high illumination level when the ambient lighting conditions near the display are bright. In at least one example embodiment, a display is illuminated.

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

Figure 3:
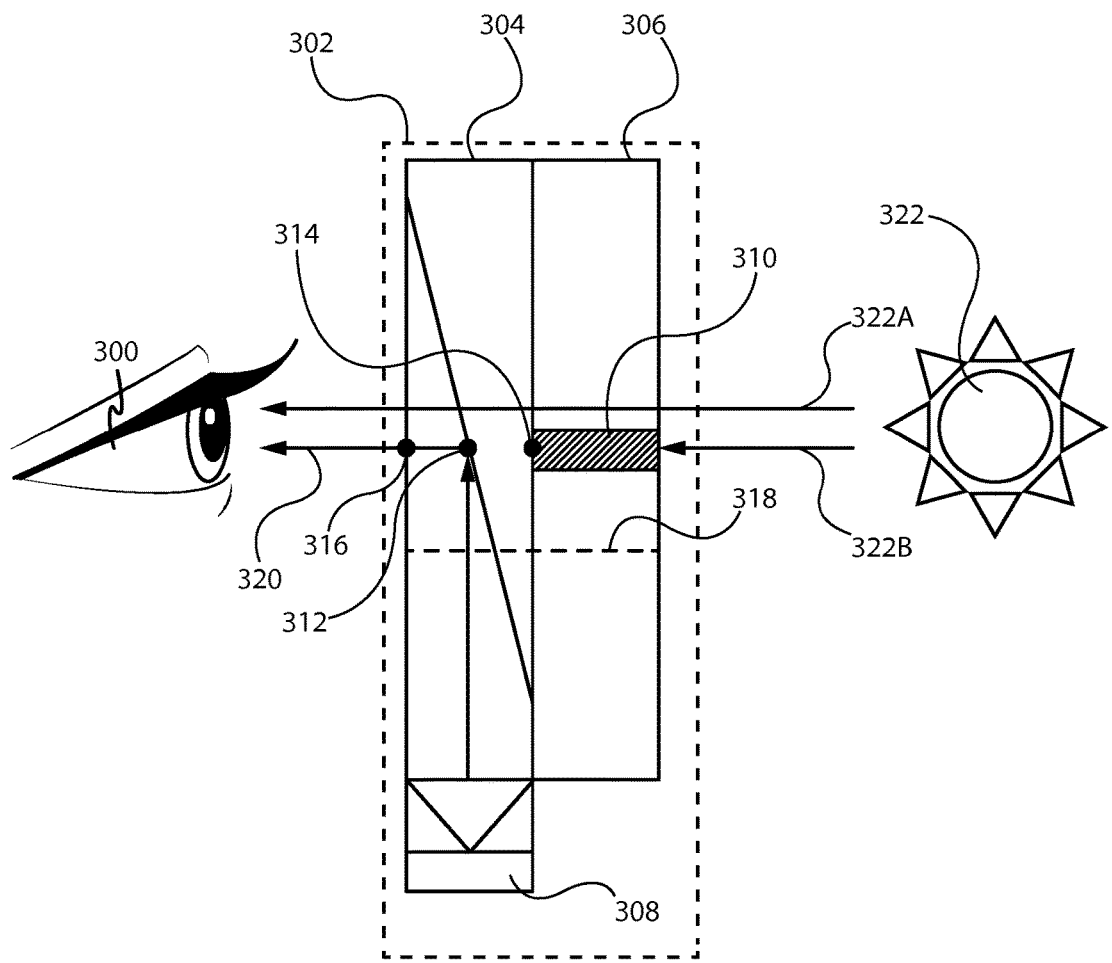
FIG. 3 is a diagram illustrating a see through display according to at least one example embodiment.

FIG. 3 is a diagram illustrating a see through display according to at least one example embodiment. The example of FIG. 3 is merely an example and does not limit the scope of the claims. For example, see through display configuration may vary, light projection display configuration may vary, light filtration array configuration may vary, and/or the like.

In many circumstances, it may be desirable to display information on a see through display, similar as described regarding the examples of FIGS. 2A-2B. For example, a viewer of the see through display may desire to browse textual content, view graphical information, and/or the like. For instance, the user may desire to view graphical information associated with an application, such as a navigational application, a weather forecast, a calendar event, an email client, and/or the like. In many circumstances, a see through display may comprise a plurality of layers associated with a plurality of components. For example, a see through display may comprise an active display, such as a light projection display. In such an example, the light projection display may comprise a liquid crystal display, a light emitting diode display, and/or the like, and utilize a reflective surface to project the light from the light projection display towards the eye of a viewer of the see through display. In some circumstances, a viewer of a light projection display may perceive washed out colors, low contrast graphical element, poor opacity of visual information, and/or the like. For example, ambient light may interfere with information displayed by the light projection display, objects viewable through the see through display may visually obstruct the information displayed by way of the light projection display, and/or the like. For example, the ambient light may be strong enough to interfere with a user's ability to differentiate light from the light projection display from the ambient light. In such circumstances, the information displayed by the light projection display may appear to be washed-out, faded, and/or difficult to interpret. As such, it may be desirable to at least partially filter ambient light at a position on the see through display that corresponds with the display of information by way of the light projection display, to at least partially obscure objects that may be viewable through the see through display, and/or the like. In at least one example embodiment, an apparatus comprises a light filtration array. The light filtration array may be an electrochromic light filtration array, a liquid crystal light filtration array, a shutter light filtration array, and/or the like. In some circumstances, the light filtration array may comprise a plurality of light filtration elements, light filtration cells, and/or the like, such that the light filtration array may be selectively actuated to filter more ambient light at a particular position on the light filtration array, to filter less ambient light at a different position on the light filtration array, and/or the like.

An electrochromic light filtration array may be a light filtration array that is configurable to change light transmission properties in response to an electrical input, for example, based on electrical current, voltage, and/or the like. As such, the electrochromic light filtration array may selectively control the amount of light that passes through the electrochromic light filtration array. Such an electrochromic light filtration array may consume an initial amount of electricity to effect a change to its opacity, but once the change has been effected, significantly less electricity, or even no electricity may be needed for maintaining the particular shade which has been reached by the light filtration array. In some circumstance, the electrochromic light filtration array may fail to transition to a wholly opaque state, and may provide visibility through the electrochromic light filtration array even in the darkened state. In this manner, the electrochromic light filtration array may filter only a portion of the ambient light that passes through the electrochromic light filtration array, while allowing some ambient light to pass through the electrochromic light filtration array.

A liquid crystal light filtration array, such as a polymer dispersed liquid crystal light filtration array, may be a light filtration array that comprises liquid crystals which are dissolved or dispersed into a liquid polymer followed by solidification or curing of the polymer. In such an example, the liquid mix of polymer and liquid crystals may be placed between two layers of glass or plastic that include a thin layer of a transparent, conductive material followed by curing of the polymer, thereby forming the a sandwich structure of the liquid crystal light filtration array. This structure may be, in effect, a capacitor. In such an example, electrodes from a power supply may be attached to the electrodes of the liquid crystal light filtration array. In such an example, with a low applied voltage to the electrodes, the liquid crystals may be randomly arranged in droplets, resulting in scattering of light as it passes through the liquid crystal light filtration array. Such a scattering of light may result in a semi-opaque appearance of at least a portion of the liquid crystal light filtration array. In such an example, when a voltage is applied to the electrodes, the electric field formed between the two electrodes of the liquid crystal light filtration array may cause the liquid crystals to align, allowing light to pass through the droplets with very little scattering and resulting in a transparent state. The degree of transparency and, similarly, the degree of opacity, of the liquid crystal light filtration array may be controlled by the applied voltage to the electrodes of the liquid crystal light filtration array. For example, at lower voltages, only a few of the liquid crystals may align completely in the electric field, so only a small portion of the light passes through while most of the light is scattered. In such an example, as the voltage is increased, fewer liquid crystals remain out of alignment, which may result in less light being scattered.

A shutter light filtration array may be a light filtration array that utilizes a plurality of small mechanical structures to selectively configure an amount of light that is transmitted through the light filtration array. Such a shutter light filtration array may be configurable to selectively control the amount of light that passes through the shutter light filtration array in response to applied voltage. For example, a shutter light filtration array may utilize small shutters, flaps, blinds, and/or the like, that are sized such that a viewer of the shutter light filtration array may be unable to perceive the shutters, the flaps, the blinds, and/or the like. For instance, a shutter light filtration array may comprise light filtration elements that are composed of rolled thin metal elements on a substrate, such as a glass substrate, a plastic substrate, and/or the like. The substrate may, for example, include a thin layer of a transparent conductive oxide, and an insulator that is deposited between the metal layer and the transparent conductive oxide layer for electrical disconnection. With a low applied voltage, the metal elements may be oriented such that ambient light pass through at least a portion of the shutter light filtration array. For example, the metal elements may be rolled, tilted, bent, and/or the like, such that at least a portion of the ambient light may pass through at least a portion of the shutter light filtration array. In such an example, when there is a voltage difference between the metal layer and the transparent conductive layer, the electric field formed between the two electrodes may cause the metal elements to reorient such that the metal elements filter a larger portion of the ambient light. The amount of ambient light filtered by the shutter light filtration array may be based, at least in part, on the magnitude of the voltage difference between the metal layer and the transparent conductive layer.

Even though the examples above refer to an input voltage, it should be understood that such terminology is merely used to provide an example, and that the manner in which the light filtration array is controlled may vary. In addition, even though the examples above attribute particular actions to a low level input and a high level input, polarity of such inputs may vary. For example, a light filtration array may be more opaque in the presence of a low voltage input, and a different light filtration array may be less opaque in the presence of a low voltage input.

In at least one example embodiment, an apparatus causes display of a graphical element at a position on a see through display that comprises a light projection display that overlays a light filtration array. In such an example embodiment, the light projection display overlays the light filtration array such that the light projection display is between a viewer of the see through display and the light filtration array. The see through display may, for example, be comprised by a head mounted display, a near eye display, and/or the like. In such an example embodiment, the display of the graphical element may be performed such that the light projection display projects the graphical element at the position on the see through display and the light filtration array filters at least a portion of ambient light at the position on the see through display. The display of information on the see through display in a manner that utilizes both the light projection display and the light filtration array may be referred to as a standard display mode.

As such, while the apparatus is in the standard display mode, the causation of display of the graphical element at the position on the see through display may, for example, comprise causation of projection, by the light projection display, of the graphical element at the position on the see through display, and causation of actuation of the light filtration array such that a plurality of light filtration cells of the light filtration array are selectively actuated in a pattern that filters at least a portion of ambient light at the position on the see through display.

The position on the see through display may, for example, be indicative of a cross-section through the light projection display and the light filtration array, such that the position on the see through display corresponds with a position on the light projection display and a position on the light filtration array. In such an example, the position on the see through display corresponds with a position on the light projection display and a position on the light filtration array, such that the position on the see through display, the position on the light projection display, and the position on the light filtration array correspond with a cross-section through the see through display that is normal to at least one surface of the see through display. In this manner, the causation of display of the graphical element at the position on the see through display may comprise causation of projection, by the light projection display, of the graphical element at the position on the light projection display, and causation of actuation of the light filtration array such that a plurality of light filtration cells of the light filtration array are selectively actuated in a pattern that filters the ambient light at the position on the light filtration array.

In some circumstances, the light projection display may be a virtual retinal display, a retinal scan display, a retinal projector, and/or the like. In such circumstances, a real image of the graphical element may be projected by the light projection display such that a viewer of the see through display perceives a virtual image of the graphical element. In some circumstances, the perceived virtual image differs from the projected real image. For example, the position of the virtual image, the size of the virtual image, the orientation of the virtual image, and/or the like may differ from the projected real image. In such circumstances, a viewer of a light projection display may perceive a projected image to be positioned at a position that differs from the position on the light projection display, from the position on a reflective surface of the light projection display, and/or the like. As such, it may be desirable to cause filtration of ambient light at a position on the light filtration array that corresponds with the perceived position of the graphical element. In at least one example embodiment, the position on the light projection display is a position on the light projection display that is perceived by a viewer of the see through display to correspond with the position on light filtration array. In such an example, there may fail to be a direct positional correspondence between the position on the light projection display and the position on the light filtration array, as depicted in the example of FIG. 3. For example, the causation of projection, by the light projection display, of the graphical element at the position on the light projection display may be performed such that a representation of the graphical element is projected into at least one retina of a viewer of the see through display. In this manner, the viewer may perceive the graphical element as being at a position on the see through display, at a position the light projection display, and/or the like, such that the perceived graphical element overlays a particular position on, region of, etc. the light filtration array. As such, the apparatus may cause actuation of the light filtration array such that a plurality of light filtration cells of the light filtration array are selectively actuated in a pattern that filters at least a portion of ambient light at the position on the see through display that the user perceives as being associated with the graphical element.

In some circumstances, a light projection display of a see through display may comprise an active light source. Such an active light source may facilitate the projection of light onto a reflective surface of the light project display such that at least a portion of the light is reflected into the eye of a viewer of the see through display. In this manner, the reflected light may form an image that is perceivable by the viewer. In at least one example embodiment, the see through display fails to comprise an active light source that is overlain by the light filtration array. For example, even though a see through display may comprise an active light source as part of a light projection display, the see through display may fail to comprise any other active light source such that the light filtration array is positioned between a viewer of the see through display and the active light source. In this manner, the light filtration array may fail to filter, from the eyes of the viewer, any active light source comprised by the see through display.

FIG. 3 is a diagram illustrating a see through display according to at least one example embodiment. The example of FIG. 3 depicts viewer 300 viewing see through display 302, which comprises light projection display 304 and light filtration array 306. In the example of FIG. 3, see through display 302 is displaying a graphical element at see through display position 316 such that user 300 may perceive the graphical element. As can be seen, light projection display 304 comprises light projector 308. As can be seen, light projector 308 of light projection display 304 projects light 320 such that light 320 originates at light projector 308, intersects a reflective surface comprised by light projection display 304 at light projection display position 312, and reflects, at least partially, towards the eye of viewer 300. In this manner, viewer 300 may perceive the light projected by projector 308 of light projection display 304. As discussed previously, it may be desirable to filter at least a portion of the ambient light being transmitted through see through display 302 in order to provide an increased level of contrast between a displayed graphical element and any objects which may be viewable through see through display 302. In this manner, as can be seen in the example of FIG. 3, light filtration cell 310 of light filtration array 306 is selectively actuated such that ambient light 322B originating from light source 322 is filtered at light filtration array position 314. As can be seen, light filtration array position 314 corresponds with light projection display position 312 and see through display position 316, such that the three positions align with a cross-section of the see through display, similar to cross-section 318. In this manner, viewer 300 perceives light 320 with light filtration cell 310 of light filtration array 306 actuated such that light filtration cell 310 blocks at least a portion of ambient light 322B. As such, viewer 300 may be able to more easily perceive light 320 in relation to any objects which may be viewable through see through display 302, without ambient light 322B interfering with the perception of light 320 from light projector 308 of light projection display 304, and/or the like.

As discussed previously, in some circumstances, a viewer of a light projection display may perceive a projected image to be positioned at a position that differs from the position on the light projection display, from the position on a reflective surface of the light projection display, and/or the like. As such, the apparatus may cause actuation of the light filtration array such that a plurality of light filtration cells of the light filtration array are selectively actuated in a pattern that filters at least a portion of ambient light at the position on the see through display that the user perceives as being associated with the graphical element. In this manner, the example of FIG. 3 is merely an example of one manner in which a see through display may be configured. In some circumstances, the position on the light projection display may fail to correspond with the position on the light filtration array. For example, light filtration array position 314 may fail to correspond with light projection display position 312, light projection display position 312 may fail to correspond with see through display position 316, and/or the like.

As can be seen in the example of FIG. 3, ambient light 322A is not actively filtered by any light filtration cell of light filtration display 306, and passed through see through display 302 such that viewer 300 may perceive ambient light 322A. In this manner, a plurality of light filtration cells of light filtration array 306 may be selectively actuated such that a portion of light filtration array 306 actively filters ambient light, a different portion of light filtration array 306 fails to actively filter ambient light, and/or the like.

Figure 4A:
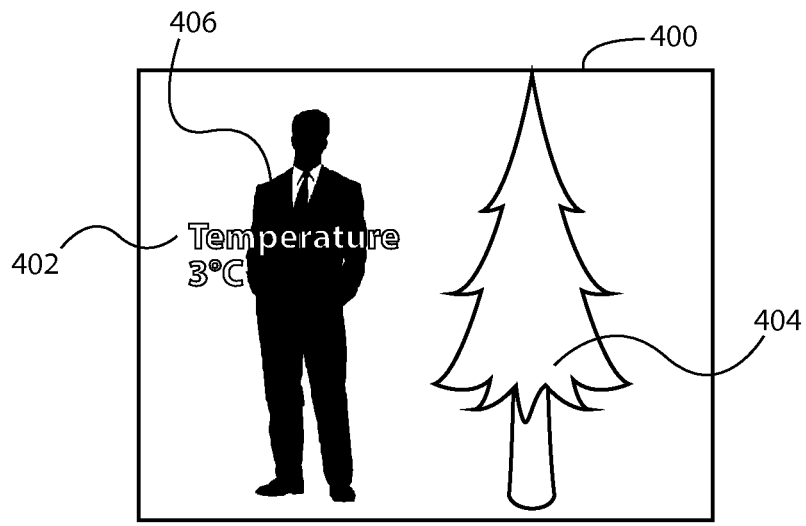
Figure 4B:
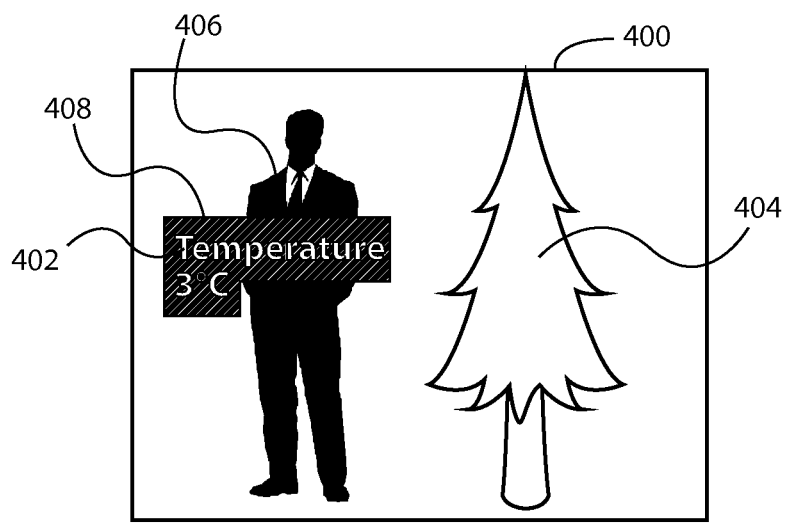

FIGS. 4A-4C are diagrams illustrating display of a graphical element on a see through display according to at least one example embodiment. The examples of FIGS. 4A-4C are merely examples and do not limit the scope of the claims. For example, see through display configuration may vary, the graphical element may vary, and/or the like.

As discussed previously, in some circumstances, it may be desirable to cause display of a graphical element on a see through display. FIG. 4A is a diagram illustrating display of a graphical element on a see through display according to at least one example embodiment. In the example of FIG. 4A, see through display 400 is caused to display graphical element 402. As can be seen, object 404 and object 406 are viewable through the see through display. For example, see through display 400 may corresponds with see through display 202 of FIG. 2A, object 404 may correspond with object 206 of FIG. 2A, and object 406 may correspond with object 205 of FIG. 2A. In this manner, a viewer of see through display 400 may perceive graphical element 402, displayed by way of see through display 400, as overlaying objects 404 and 406, which are viewable through see through display 400. As can be seen, the objects that are viewable through see through display 400 may interfere with a viewer's perception of graphical elements caused to be displayed by way of see through display 400, may affect the contrast of such graphical elements, and/or the like. In this manner, it can be seen that a portion of graphical element 402 is difficult to perceive due to the level of ambient lighting interfering with the ability of the viewer to distinguish between light projected by the see through display and the ambient lighting, lacks contrast in the region of see through display 400 that fails to have the ambient lighting blocked by object 406, and/or the like. Alternatively, it can be seen that a portion of graphical element 402 is more easily perceivable due to the ambient light being blocked by object 406.

As discussed previously, in some circumstances, it may be desirable to cause display of a graphical element on a see through display that comprises a light projection display and a light filtration array. FIG. 4B is a diagram illustrating display of a graphical element on a see through display according to at least one example embodiment. The example of FIG. 4B corresponds with the example of FIG. 4A subsequent to actuation of light filtration cells of the light filtration array in the pattern indicated by light filtration region 408. As can be seen, the position, arrangement, orientation, etc. of light filtration region 408 on the see through display corresponds with the position, arrangement, orientation, etc. of graphical element 402 on the see through display. In this manner, light filtration region 408 filters at least a portion of the ambient light that would otherwise be transmitted through the light filtration array at positions that correspond with the portion of see through display 400 that corresponds with the display of graphical element 402. As can be seen, in comparison with the example of FIG. 4A, the projected light that forms the image of graphical element 402 of FIG. 4B is more easily distinguishable from the ambient light based, at least in part, on light filtration region 408 blocking the ambient light from the viewer's eyes.

FIG. 4C is a diagram illustrating display of a graphical element on a see through display according to at least one example embodiment. FIG. 4C depicts an exploded perspective view of the example of FIG. 4B. As can be seen, viewer 420 of see through display 400 is peering through light projection display 410 and light filtration array 412 of see through display 400. As described regarding the examples of FIGS. 4A and 4B, objects 406 and 404 are viewable by viewer 420 through see through display 400. As can be seen, graphical element 402 is caused to be displayed by light projection display 410 at a light projection display position, and light filtration array 412 is caused to be selectively actuated in a pattern, represented by light filtration region 408, such that the light filtration cells filter at least partially filter ambient light from transmission through light filtration array 412 and, thus, light projection display 410. As can be seen, the position, arrangement, orientation, etc. of graphical element 412 corresponds with the position, arrangement, orientation, etc. of light filtration region 408. In this manner, light filtration region 408 enhances the readability, contrast, perceptibility, and/or the like of graphical element 402 with respect to viewer 420.

FIGS. 5A-5D are diagrams illustrating actuation of a light filtration array such that a plurality of light filtration cells of the light filtration array are selectively actuated in a pattern that depicts a notification according to at least one example embodiment. The examples of FIGS. 5A-5D are merely examples and do not limit the scope of the claims. For example, notification configuration may vary, notification design may vary, notification size may vary, notification resolution may vary, and/or the like.

In many circumstances, a see through display may be comprised by a head mounted display. In such circumstances, the head mounted display may be designed such that the head mounted display is in a small form factor, is unobtrusive and/or fashionable, etc. In many circumstances, the battery capacity of the batteries powering the head mounted display may be limited due to sizing constraints associated with the housing of such a head mounted display, due to weight, and/or the like. As such, it is keenly important to properly manage the consumption of the limited battery capacity, and to efficiently conserve such battery capacity whenever it is possible to do so. In many circumstances, a see through display of the head mounted display may be the primary power draw for the head mounted display. Specifically, a light projection display of the see through display often requires significantly more power to operate than other components of the see through display, such as the light filtration array. For example, a light projector of a light projection display may draw significantly more power than is drawn by a light filtration array, since the light filtration array may only draw power when specific light filtration cells of the light filtration array are actuated. As such, in some circumstances, it may be desirable to transition from a standard display mode, a display mode that utilizes both the light projection display and the light filtration array, to a low power display mode. For example, in circumstances in which a viewer of the see through display is not actively viewing information, interacting with the see through display, and/or the like, it may be desirable to conserve power by way of transitioning to the low power display mode.

In at least one example embodiment, an apparatus transitions from a standard display mode to a low power display mode. Such a low power display mode may configure the see through display to consume less power than the see through display consumes in the standard display mode. The low power display mode may disable the light projection display, terminate the display of information by way of the light projection display, modify one or more properties of the light projection display such that the light projection display consumes less power in the low power display mode, and/or the like. In at least one example embodiment, an apparatus causes termination of display of the graphical element on the see through display based, at least in part, on the low power display mode. For example, in response to the transitioning from the standard display mode to the lower power display mode, the apparatus may cause termination of display of the graphical element on the see through display. The termination of display of the graphical element on the see through display may, for example, comprise causing the light projection display to terminate projection of the graphical element, and causing the light filtration array to terminate filtration of the ambient light at the position on the see through display. In at least one example embodiment, causing the light projection display to terminate projection of the graphical element comprises disablement of the light projection display. As described previously, the position on the see through display may correspond with a position on the light projection display and a position on the light filtration array. As such, the causation of the light filtration array to terminate filtration of the ambient light at the position on the see through display may comprise causation of actuation of the light filtration array such that a plurality of light filtration cells of the light filtration array are selectively actuated in a pattern that fails to filter the ambient light at the position on the light filtration array.

As electronic apparatuses become increasingly pervasive in our society, users of such apparatuses increasing depend upon their apparatuses to facilitate the user in communicating with others, scheduling the user's time, checking the weather forecast, and/or the like. As such, users are becoming increasingly dependent upon their apparatuses for informing them that particular events have occurred. In at least one example embodiment, an apparatus determines that an event has occurred. For example, an event may be a communication event, such as receipt of an email, a missed telephone call, a new text message, and/or the like. In another example, an event may be a navigational event. For example, the user of the apparatus may utilize the apparatus to plan a route to a destination, and a navigational event may indicate that the user is to turn a certain direction, that the user has arrived at the destination, and/or the like. In some circumstances, the event may be a weather event, such as a flash flood warning, an impending storm on the horizon, a temperature alert, and/or the like. In yet another example, an event may be a calendar event, such as a meeting reminder, a countdown to the next scheduled appointment, and/or the like. As described previously, in some circumstances, it may be desirable to transition an apparatus into a low power display mode in order to facilitate conservation of battery power, lengthening of usable battery life, and/or the like. In such circumstances, a user of the apparatus may nonetheless desire to be notified of occurrence of certain events, such as the events mentioned previously. As such, the user may continue to benefit from utilization of the user's apparatus while the apparatus is operating in the low power display mode.

In at least one example embodiment, an apparatus generates a notification that signifies the event. For example, the event may be a communication event, and the notification may be indicative of the communication event, of occurrence of the communication event, and/or the like. In such an example, the event may be associated with a missed call, a plurality of new emails, receipt of a text message, and/or the like, and the notification may depict a telephone icon, a shaded region that grows in size proportionally with the number of new emails, or an envelope graphic, and/or the like, respectively. In another example, the event may be a navigational event, and the notification may be indicative of the navigational event, occurrence of the navigational event, and/or the like. In such an example, the event may be associated with a navigational instruction, a direction that the user is to turn, and/or the like, and the notification may depict a shaded region that is representative of the distance to be traveled or an arrow that indicates the direction that the user is to turn, and/or the like, respectively. In some circumstances, the event may be a weather event, and the notification may be indicative of the weather event, of occurrence of the weather event, and/or the like. In such circumstances, the event may be associated with a storm alert, an impending heat wave, and/or the like, and the notification may be representative of a dark cloud, a throbbing sun, and/or the like, respectively. In yet another example, the event may be a calendar event, and the notification may be indicative of the calendar event, occurrence of the calendar event, and/or the like. In such an example, the event may be associated with a calendar event reminder, a countdown until the user's next scheduled meeting, and/or the like, and the notification may depict a blinking alarm bell, a shaded region that indicates the time until the user's next scheduled meeting, and/or the like, respectively. The notification may comprise visual information, textual information, and/or the like, and may be static, animated, and/or the like, such that the notification conveys at least one characteristic associated with the event to the user.

As discussed previously, while an apparatus is operating in the low power mode, the light projection display may be disabled such that the apparatus consumes less power than when operating in the standard display mode. However, it should be understood that the user may desire to be notified of events that occur when the apparatus is operating in a low power mode. However, it may be desirable to avoid the higher power consumption of the light projection display, while still providing a notification that signifies the event to the user. In order to facilitate presentation of the notification to the viewer while an apparatus is operating in a low power mode, it may be desirable to configure the apparatus such that the apparatus may utilize the light filtration array to present such a notification to the viewer. In this manner, rather than solely utilizing the light filtration array to shield the light projection display from ambient light the apparatus may utilize the light filtration array separately and independently from the light projection display in order to present the notification to the user. In at least one example embodiment, an apparatus causes actuation of the light filtration array such that a plurality of light filtration cells of the light filtration array are selectively actuated in a pattern that depicts the notification. Such actuation of the light filtration array may be based at least in part, on the low power display mode, in response to the determination of occurrence of the event while in the low power display mode, in response to the generation of the notification while the light projection display is disabled, and/or the like.

The actuation of the light filtration array such that the plurality of light filtration cells of the light filtration array are selectively actuated in the pattern that depicts the notification may be performed absent consideration of any object that is viewable through the see through display. For example, the apparatus may fail to consider any object that is viewable through the see through display, may actuate the plurality of light filtration cells without regard for any correspondence between the light filtration cells and any object which may be viewable through the see through display, and/or the like. For example, the pattern that depicts the notification may overlay various objects which may be viewable through the see through display, may obstruct a user's perception of objects viewable through the see through display, without regard for any visual complexity of the environment that is viewable through the see through display, and/or the like. In this manner, the apparatus may selectively actuate a plurality of light filtration cells independently of any object that may be seen through the see through display.

The actuation of the light filtration array such that the plurality of light filtration cells of the light filtration array are selectively actuated in the pattern that depicts the notification may be performed absent consideration of any graphical element that is displayed on the light projection display. In this manner, rather than solely utilizing the light filtration array to shield the light projection display from ambient light, the apparatus may utilize the light filtration array separately and independently from the light projection display in order to convey occurrence of an event to a viewer by way of actuation of the light filtration array in a specific pattern that depicts a notification that signifies the event, the occurrence of the event, and/or the like.

The actuation of the light filtration array such that the plurality of light filtration cells of the light filtration array are selectively actuated in the pattern that depicts the notification may be performed absent consideration of any light source that is viewable through the see through display. For example, the actuation of the light filtration array may fail to consider any ambient light source in the environment surrounding the apparatus, such as the sun, a light bulb, a lamp, a television backlight, and/or the like. However, the existence of an ambient light source, such as the sun, a light bulb, a lamp, a television backlight, and/or the like, may enhance the viewer's ability to perceive the notification that is presented to the viewer by way of the light filtration array. For example, the light filtration array may be selectively actuated such that a plurality of light filtration cells form a pattern that is perceived by a viewer as a darkened region of the viewer's field of view, as a semi-opaque indicator, and/or the like.

Figure 5A:
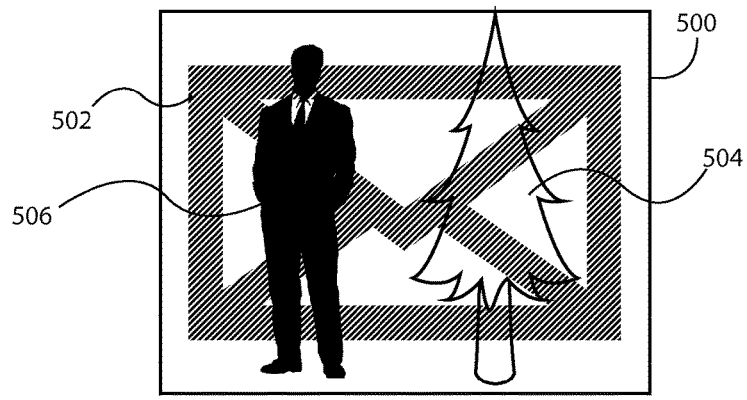
FIGS. 5A-5D are diagrams illustrating actuation of a light filtration array such that a plurality of light filtration cells of the light filtration array are selectively actuated in a pattern that depicts a notification according to at least one example embodiment.

FIG. 5A is a diagram illustrating actuation of a light filtration array such that a plurality of light filtration cells of the light filtration array are selectively actuated in a pattern that depicts a notification according to at least one example embodiment. In the example of FIG. 5A, a light filtration array of see through display 500 is caused to be actuated such that a plurality of light filtration cells of the light filtration array are selectively actuated in a pattern that depicts notification 502. Notification 502 may, for example, indicate a communication event associated with receipt of an email, a text message, and/or the like. As can be seen, object 504 and object 506 are viewable through the see through display. For example, see through display 500 may corresponds with see through display 202 of FIG. 2A, object 504 may correspond with object 206 of FIG. 2A, and object 506 may correspond with object 205 of FIG. 2A. In this manner, a viewer of see through display 500 may perceive notification 502, presented by way of the light filtration array comprised by see through display 500, as at least partially overlaying, obstructing, darkening, shading, etc. objects 504 and 506, and other portions of the environment, which are viewable through see through display 500. In this manner, a viewer of see through display 500 may perceive notification 502, presented by way of a light filtration array comprised by see through display 500, since the light filtration cells associated with notification 502 at least partially filter ambient light from transmission through the light filtration array and, thus, into the eye of the viewer.

Figure 5B:
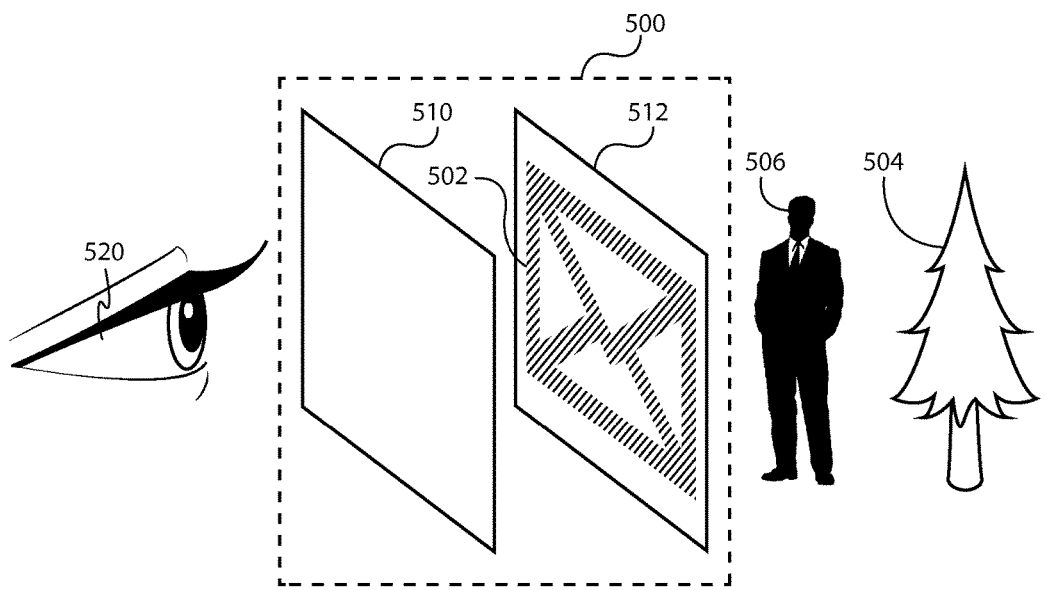

FIG. 5B is a diagram illustrating actuation of a light filtration array such that a plurality of light filtration cells of the light filtration array are selectively actuated in a pattern that depicts a notification according to at least one example embodiment. FIG. 5B depicts an exploded perspective view of the example of FIG. 5A. As can be seen, viewer 520 of see through display 500 is peering through light projection display 510 and light filtration array 512 of see through display 500. As described regarding the example of FIG. 5A, objects 506 and 504 are viewable by viewer 520 through see through display 500. As can be seen, notification 502 is caused to be presented by light filtration array 512 by way of selective actuation of a plurality of light filtration cells of light filtration array 512 in a pattern that depicts notification 502. In this manner, viewer 520 may perceive notification 502, presented by way of light filtration array 512, since the light filtration cells associated with notification 502 at least partially filter ambient light from transmission through light filtration array 512 and, thus, into the eye of viewer 520.

Figure 5C:
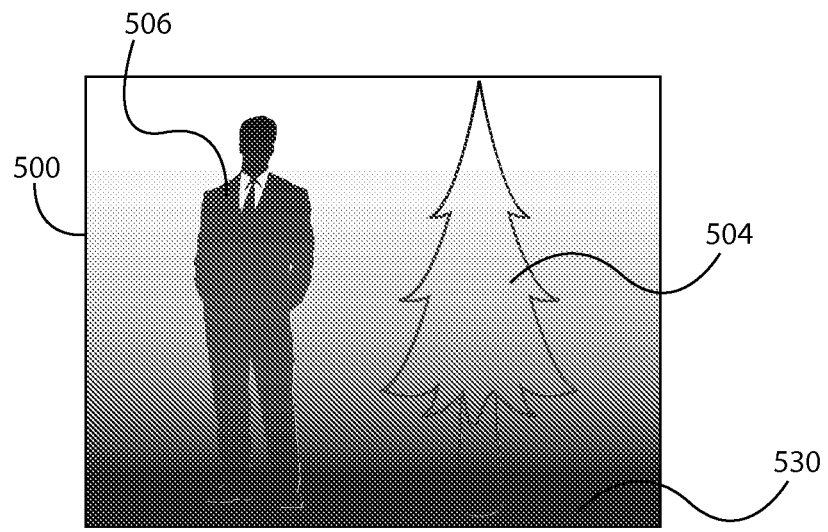

FIG. 5C is a diagram illustrating actuation of a light filtration array such that a plurality of light filtration cells of the light filtration array are selectively actuated in a pattern that depicts a notification according to at least one example embodiment. In the example of FIG. 5C, a light filtration array of see through display 500 is caused to be actuated such that a plurality of light filtration cells of the light filtration array are selectively actuated in a pattern that depicts notification 530. Notification 530 may, for example, indicate a growing number of communication events associated with a plurality of new emails, a growing number of unread text message, and/or the like. Notification 530 may, for example, increase in size, increase in opacity, and/or the like, proportionally with the increase in the number of communication events that have occurred. As can be seen, object 504 and object 506 are viewable through the see through display. For example, see through display 500 may corresponds with see through display 202 of FIG. 2A, object 504 may correspond with object 206 of FIG. 2A, and object 506 may correspond with object 205 of FIG. 2A. In this manner, a viewer of see through display 500 may perceive notification 530, presented by way of the light filtration array comprised by see through display 500, as at least partially overlaying, obstructing, darkening, shading, etc. objects 504 and 506, and other portions of the environment, which are viewable through see through display 500. In this manner, a viewer of see through display 500 may perceive notification 530, presented by way of a light filtration array comprised by see through display 500, since the light filtration cells associated with notification 530 at least partially filter ambient light from transmission through the light filtration array and, thus, into the eye of the viewer.

Figure 5D:
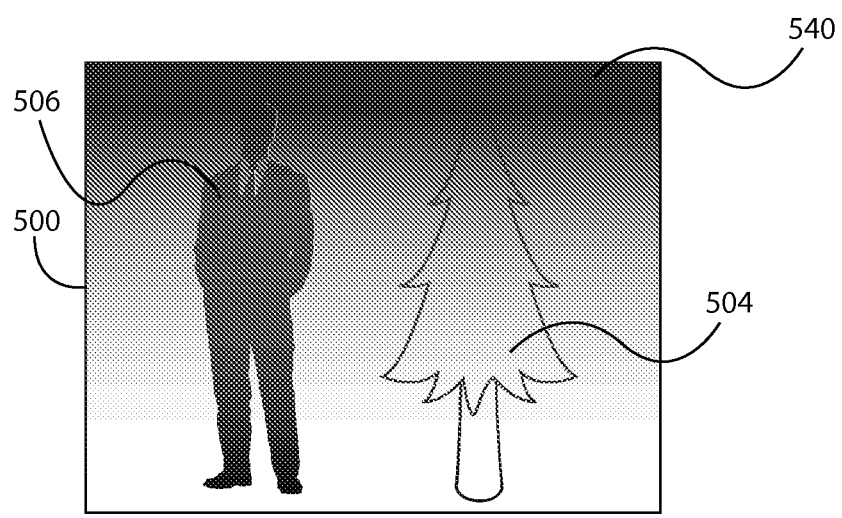

FIG. 5D is a diagram illustrating actuation of a light filtration array such that a plurality of light filtration cells of the light filtration array are selectively actuated in a pattern that depicts a notification according to at least one example embodiment. In the example of FIG. 5D, a light filtration array of see through display 500 is caused to be actuated such that a plurality of light filtration cells of the light filtration array are selectively actuated in a pattern that depicts notification 540. Notification 540 may, for example, indicate an impending storm, a cloudy forecast, and/or the like. Notification 540 may, for example, increase in size, increase in opacity, and/or the like, proportionally with the severity of the impending storm, the immediacy of the cloudy forecast, and/or the like. As can be seen, object 504 and object 506 are viewable through the see through display. For example, see through display 500 may corresponds with see through display 202 of FIG. 2A, object 504 may correspond with object 206 of FIG. 2A, and object 506 may correspond with object 205 of FIG. 2A. In this manner, a viewer of see through display 500 may perceive notification 540, presented by way of the light filtration array comprised by see through display 500, as at least partially overlaying, obstructing, darkening, shading, etc. objects 504 and 506, and other portions of the environment, which are viewable through see through display 500. In this manner, a viewer of see through display 500 may perceive notification 540, presented by way of the light filtration array that is comprised by see through display 500, since the light filtration cells associated with notification 540 at least partially filter ambient light from transmission through the light filtration array and, thus, into the eye of the viewer.

In some circumstances, it may be desirable to transition from a low power display mode to a standard display mode, to resume utilization of a light projection display, to enable a light projection display, to display information by way of a light projection display, and/or the like. For example, while the apparatus is operating in a low power display mode, the apparatus may determine occurrence of an event, generate a notification that signifies the event, and cause actuation of the light filtration array such that the light filtration array presents a representation of the notification to the viewer of the apparatus. In such an example, the user may desire to view additional information associated with the notification, the event, and/or the like. In many circumstances, a light projection display may be better suited for the display of detailed information, textual content, and/or the like, as the light projection display may provide an enhanced contrast ratio, a higher resolution depiction, and/or the like. In at least one example embodiment, an apparatus receives information indicative of a notification selection input that indicates selection of the notification while the apparatus is operating in the light filtration display mode. In such an example embodiment, the apparatus may transition from the low power display mode to the standard display mode based, at least in part, on the notification selection input, and cause display of event content associated with the event on the light projection display based, at least in part, on the standard display mode.

Figure 6:
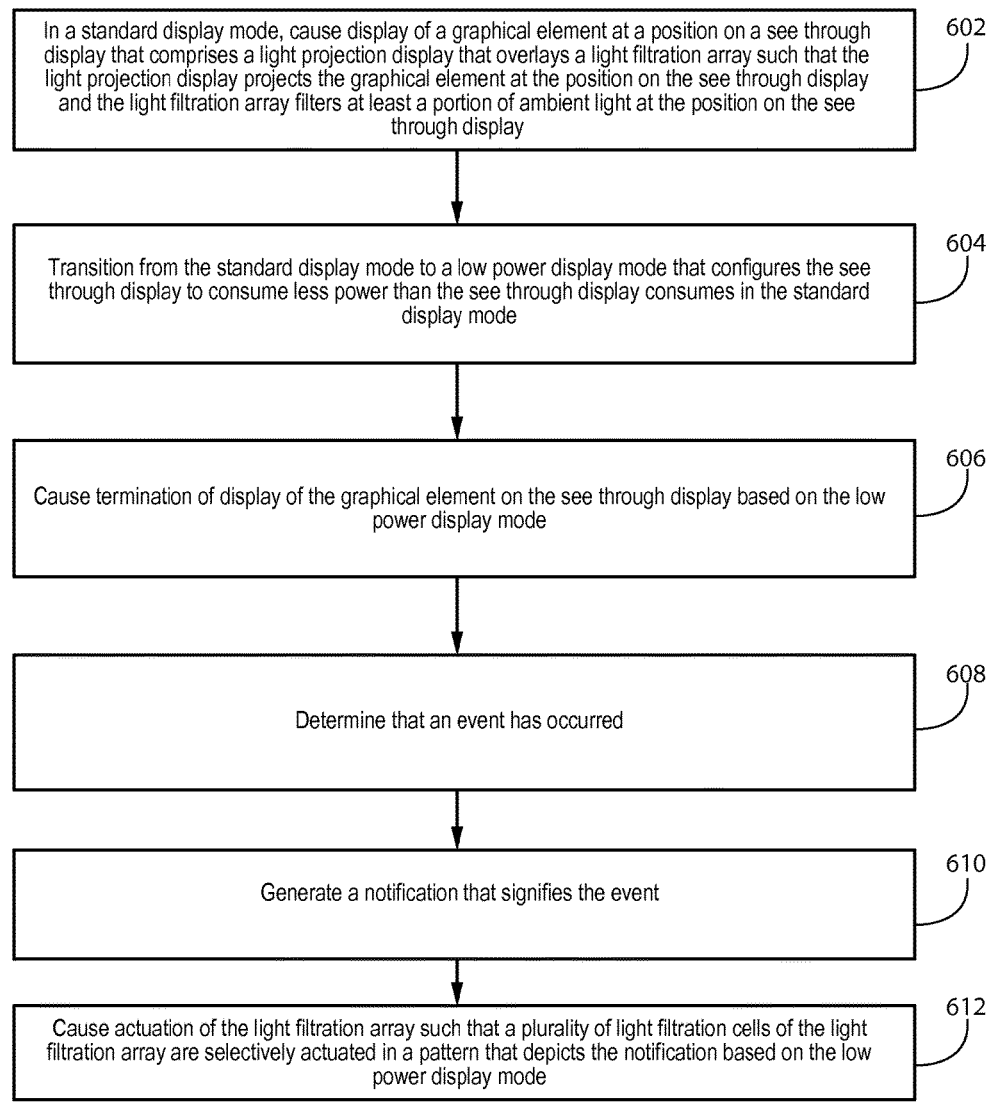
FIG. 6 is a flow diagram illustrating activities associated with causation of actuation of a light filtration array according to at least one example embodiment.

FIG. 6 is a flow diagram illustrating activities associated with causation of actuation of a light filtration array according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

At block 602, the apparatus, in a standard display mode, causes display of a graphical element at a position on a see through display that comprises a light projection display that overlays a light filtration array such that the light projection display projects the graphical element at the position on the see through display and the light filtration array filters at least a portion of ambient light at the position on the see through display. The standard display mode, the causation of display, the graphical element, the see through display, the position on the see through display, the light projection display, the light filtration array, and the filtration of ambient light may be similar as described regarding FIGS. 2A-2B, FIG. 3, and FIGS. 4A-4C.

At block 604, the apparatus transitions from the standard display mode to a low power display mode that configures the see through display to consume less power than the see through display consumes in the standard display mode. The transition and the low power display mode may be similar as described regarding FIGS. 2A-2B, FIG. 3, FIGS. 4A-4C, and FIGS. 5A-5D.

At block 606, the apparatus causes termination of display of the graphical element on the see through display based, at least in part, on the low power display mode. The causation of termination of display may be similar as described regarding FIGS. 2A-2B, FIG. 3, FIGS. 4A-4C, and FIGS. 5A-5D.

At block 608, the apparatus determines that an event has occurred. The determination and the event may be similar as described regarding FIGS. 4A-4C and FIGS. 5A-5D.

At block 610, the apparatus generates a notification that signifies the event. The generation and the notification may be similar as described regarding FIGS. 4A-4C and FIGS. 5A-5D.

At block 612, the apparatus causes actuation of the light filtration array such that a plurality of light filtration cells of the light filtration array are selectively actuated in a pattern that depicts the notification based, at least in part, on the low power display mode. The causation of actuation, the plurality of light filtration cells, and the pattern may be similar as described regarding FIGS. 5A-5D.

Figure 7:
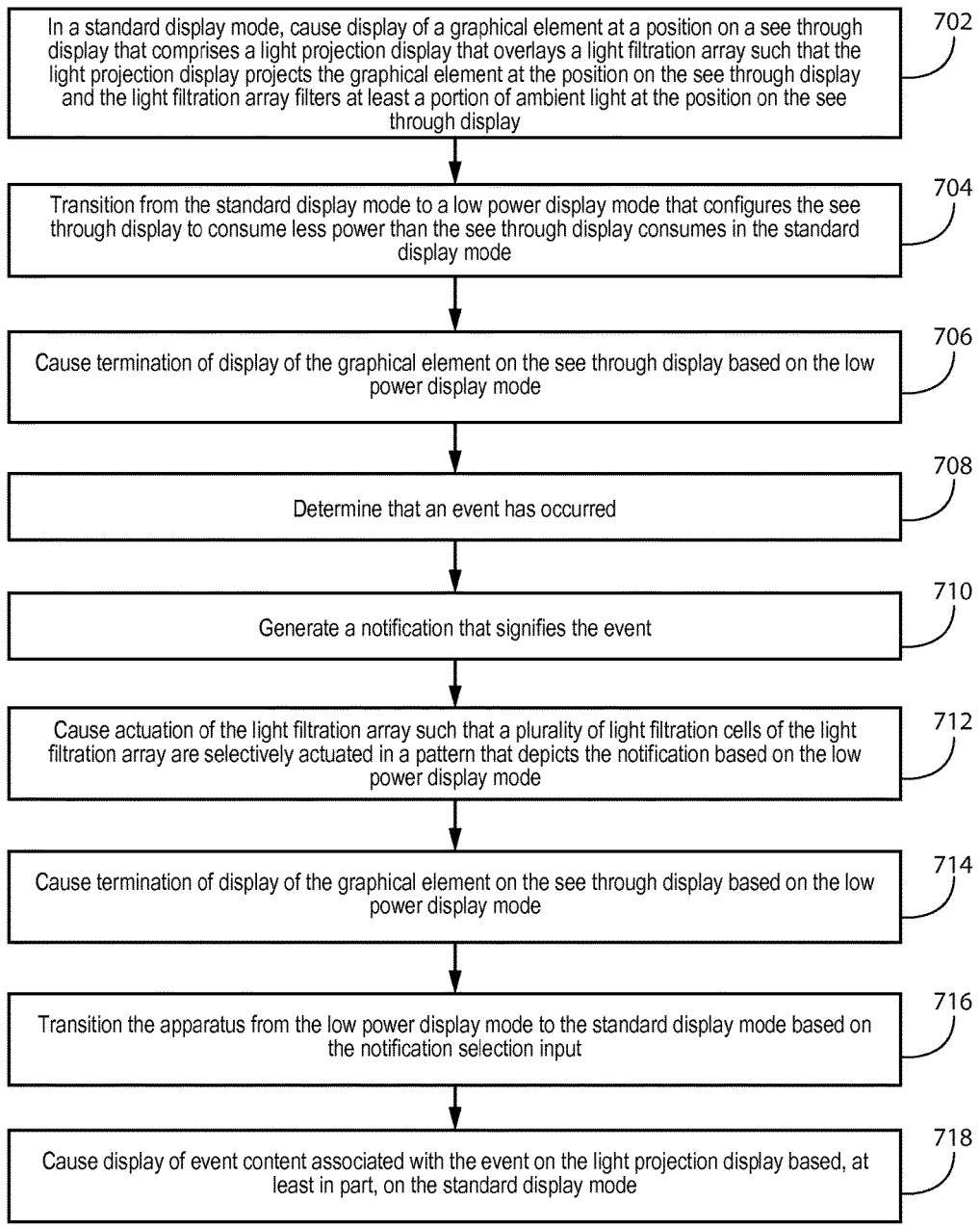
FIG. 7 is a flow diagram illustrating activities associated with causation of actuation of a light filtration array according to at least one example embodiment.

FIG. 7 is a flow diagram illustrating activities associated with causation of actuation of a light filtration array according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

As discussed previously, in some circumstances, it may be desirable to transition from a low power display mode to a standard display mode.

At block 702, the apparatus, in a standard display mode, causes display of a graphical element at a position on a see through display that comprises a light projection display that overlays a light filtration array such that the light projection display projects the graphical element at the position on the see through display and the light filtration array filters at least a portion of ambient light at the position on the see through display. The standard display mode, the causation of display, the graphical element, the see through display, the position on the see through display, the light projection display, the light filtration array, and the filtration of ambient light may be similar as described regarding FIGS. 2A-2B, FIG. 3, and FIGS. 4A-4C.

At block 704, the apparatus transitions from the standard display mode to a low power display mode that configures the see through display to consume less power than the see through display consumes in the standard display mode. The transition and the low power display mode may be similar as described regarding FIGS. 2A-2B, FIG. 3, FIGS. 4A-4C, and FIGS. 5A-5D.

At block 706, the apparatus causes termination of display of the graphical element on the see through display based, at least in part, on the low power display mode. The causation of termination of display may be similar as described regarding FIGS. 2A-2B, FIG. 3, FIGS. 4A-4C, and FIGS. 5A-5D.

At block 708, the apparatus determines that an event has occurred. The determination and the event may be similar as described regarding FIGS. 4A-4C and FIGS. 5A-5D.

At block 710, the apparatus generates a notification that signifies the event. The generation and the notification may be similar as described regarding FIGS. 4A-4C and FIGS. 5A-5D.

At block 712, the apparatus causes actuation of the light filtration array such that a plurality of light filtration cells of the light filtration array are selectively actuated in a pattern that depicts the notification based, at least in part, on the low power display mode. The causation of actuation, the plurality of light filtration cells, and the pattern may be similar as described regarding FIGS. 5A-5D.

At block 714, the apparatus receives information indicative of a notification selection input that indicates selection of the notification while the apparatus is operating in the light filtration display mode. The receipt and the notification selection input may be similar as described regarding FIGS. 5A-5D.

At block 716, the apparatus transitions the apparatus from the low power display mode to the standard display mode based, at least in part, on the notification selection input. The transition may be similar as described regarding FIGS. 2A-2B, FIG. 3, FIGS. 4A-4C, and FIGS. 5A-5D.

At block 718, the apparatus causes display of event content associated with the event on the light projection display based, at least in part, on the standard display mode. The causation of display and the event content may be similar as described regarding FIGS. 2A-2B, FIG. 3, FIGS. 4A-4C, and FIGS. 5A-5D.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 606 of FIG. 6 may be performed before block 604 of FIG. 6. Furthermore, if desired, one or more of the above-described functions may be optional or may be combined. For example, block 610 of FIG. 6 may be optional and/or combined with block 608 of FIG. 6. In another example, block 606 of FIG. 6 may be combined with block 604 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. A method comprising:
   in a standard display mode, causing display of a graphical element at a position on a see through display that comprises a light projection display that overlays a light filtration array such that the light projection display projects the graphical element at the position on the see through display and the light filtration array filters at least a portion of ambient light at the position on the see through display;
   transitioning from the standard display mode to a low power display mode that configures the see through display to consume less power than the see through display consumes in the standard display mode;
   causing termination of display of the graphical element on the see through display based, at least in part, on the low power display mode;
   determining that an event has occurred, wherein the event is unrelated to a view of a viewer of the see through display;
   generating a notification that signifies the event;
   causing actuation of the light filtration array such that a plurality of light filtration cells of the light filtration array are selectively actuated in a pattern that depicts the notification based, at least in part, on the low power display mode.

2. The method of claim 1, wherein the light projection display overlays the light filtration array such that the light projection display is between the viewer of the see through display and the light filtration array.

3. The method of claim 1, wherein the termination of display of the graphical element on the see through display comprises:
   causing the light projection display to terminate projection of the graphical element; and
   causing the light filtration array to terminate filtration of the ambient light at the position on the see through display.

4. The method of claim 3, wherein the position on the see through display corresponds with a position on the light projection display and a position on the light filtration array, and the causation of the light filtration array to terminate filtration of the ambient light at the position on the see through display comprises causing of actuation of the light filtration array such that the plurality of light filtration cells of the light filtration array are selectively actuated in a pattern that fails to filter the ambient light at the position on the light filtration array.

5. The method of claim 3, wherein the causation of the light projection display to terminate projection of the graphical element comprises disablement of the light projection display.

6. The method of claim 1, wherein the causation of display of the graphical element at the position on the see through display comprises:
   causing projection, by the light projection display, of the graphical element at the position on the see through display; and
   causing actuation of the light filtration array such that the plurality of light filtration cells of the light filtration array are selectively actuated in a pattern that filters at least a portion of ambient light at the position on the see through display.

7. The method of claim 1, wherein the position on the see through display corresponds with a position on the light projection display and a position on the light filtration array, and the causation of display of the graphical element at the position on the see through display comprises:
   causing projection, by the light projection display, of the graphical element at the position on the light projection display; and
   causing actuation of the light filtration array such that the plurality of light filtration cells of the light filtration array are selectively actuated in a pattern that filters the ambient light at the position on the light filtration array.

8. The method of claim 1, wherein the position on the see through display is indicative of a cross-section through the light projection display and the light filtration array, such that the position on the see through display corresponds with a position on the light projection display and a position on the light filtration array.

9. The method of claim 1, wherein the see through display fails to comprise an active light source such that the light filtration array is positioned between the viewer of the see through display and the active light source.

10. The method of claim 1, wherein the actuation of the light filtration array such that the plurality of light filtration cells of the light filtration array are selectively actuated in the pattern that depicts the notification is performed absent consideration of any object that is viewable through the see through display.

11. The method of claim 1, wherein the light filtration array is at least one of an electrochromic light filtration array, a liquid crystal light filtration array, a microblind light filtration array, a nanocrystal light filtration array, or a shutter light filtration array.

12. The method of claim 1, wherein the see through display is comprised by a head mounted display.

13. An apparatus comprising:
at least one processor; and
at least one memory including computer program code the at least one memory and the computer program code configured to, with the at least one processor, cause the apparatus to perform at least the following:
in a standard display mode, cause display of a graphical element at a position on a see through display that comprises a light projection display that overlays a light filtration array such that the light projection display projects the graphical element at the position on the see through display and the light filtration array filters at least a portion of ambient light at the position on the see through display; transitioning from the standard display mode to a low power display mode that configures the see through display to consume less power than the see through display consumes in the standard display mode;
cause termination of display of the graphical element on the see through display based, at least in part, on the low power display mode;
determine that an event has occurred, wherein the event is unrelated to a view of a user of the see through display;
generate a notification that signifies the event;
cause actuation of the light filtration array such that a plurality of light filtration cells of the light filtration array are selectively actuated in a pattern that depicts the notification based, at least in part, on the low power display mode.

14. A computer program product comprising a non-transitory computer readable medium bearing computer program code embodied therein for use with a computer, the computer program code comprising:
code for, in a standard display mode, causing display of a graphical element at a position on a see through display that comprises a light projection display that overlays a light filtration array such that the light projection display projects the graphical element at the position on the see through display and the light filtration array filters at least a portion of ambient light at the position on the see through display; transitioning from the standard display mode to a low power display mode that configures the see through display to consume less power than the see through display consumes in the standard display mode;
code for causing termination of display of the graphical element on the see through display based, at least in part, on the low power display mode;
code for determining that an event has occurred, wherein the event is unrelated to a view of a user of the see through display;
code for generating a notification that signifies the event;
code for causing actuation of the light filtration array such that a plurality of light filtration cells of the light filtration array are selectively actuated in a pattern that depicts the notification based, at least in part, on the low power display mode.

* * * * *